March 7, 1967 F. SCHMID 3,307,520
COVER PLATE FOR LIQUID MANURE CHANNELS IN COW STALLS
Filed Nov. 17, 1964

United States Patent Office 3,307,520
Patented Mar. 7, 1967

3,307,520
COVER PLATE FOR LIQUID MANURE CHANNELS IN COW STALLS
Franz Schmid, Vilshofen, Lower Bavaria, Germany (% Patentanwalt Adolf Berglein, Widenmayerstrasse 49, Munich, Germany)
Filed Nov. 17, 1964, Ser. No. 411,938
8 Claims. (Cl. 119—28)

The invention relates to cover plates for excrement cow stable gutter channels adapted to be set at least in one row in structures in which occasionally mechanical dung removal tools are slidably moved over the cover plates and the floor of the structure.

The known cover plates of this kind are generally settled in at least one row after another. As the plates are shaped with rectangular corners between two adjacent cover plates thrust edges are formed, transversely to the longitudinal direction of the plates by which arrangement obstruction or damages of the tools which are generally moved in longitudinal direction are caused or lifting and damages of the plates occur.

One object of the invention is to avoid these drawbacks by a cover plate which allows sliding movement of the tools over the plates without obstruction.

For this purpose according to the invention the cover plates are formed with thrust edges which are directed obliquely to the longitudinal direction of the channel. The thrust edges of the plates placed one after the other are bevelled or rounded off at least at the tapering spots in direction to the lower side of the plate.

In the drawing some embodiments of the subject of the invention are schematically shown.

Figure 1:
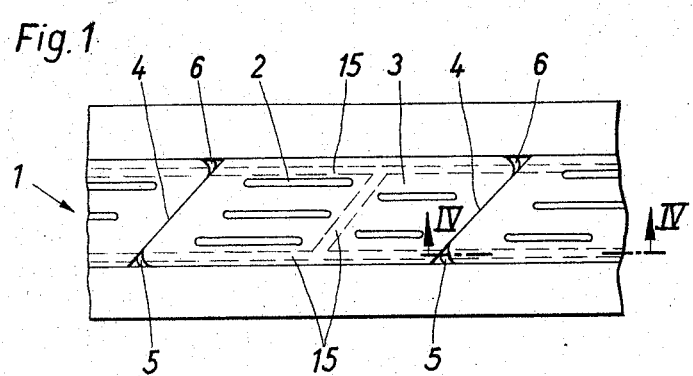
FIG. 1 shows an embodiment of an arrangement with one row of plates over a liquid excrement channel seen from above whereby the thrust edges of the plates have an oblique direction to the longitudinal direction of the liquid manure channel.
Figure 2:
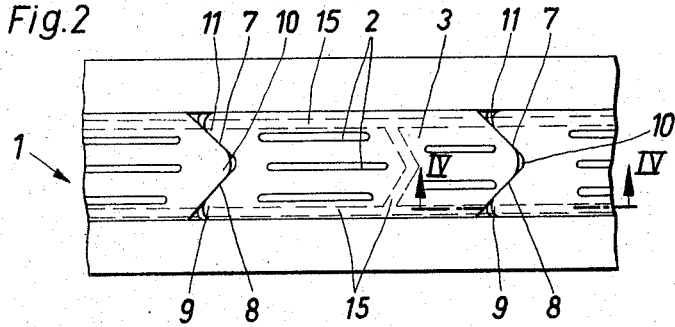
FIG. 2 shows another embodiment of the plate arrangement with tooth-shaped interengaging thrust edges of the adjacent plates seen from above.
Figure 3:
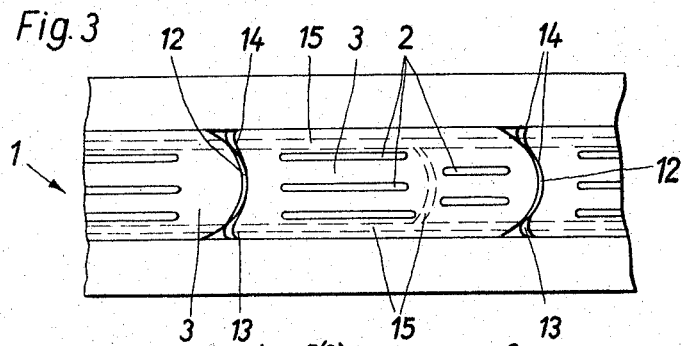
FIG. 3 shows a further embodiment of the plate arrangement with bow-shaped interengaging thrust edges of the adjacent plates seen from above.
Figure 4:
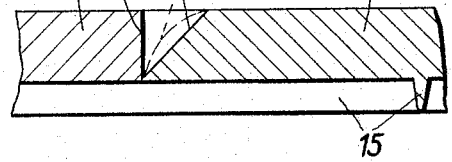
FIG. 4 shows a cross section through the arrangement of plates after line IV—IV in FIG. 1 and 2.

In the embodiments of the drawing the plates 3, furnished with longitudinal slits 2 for the manure or excrement to pass through, are laid at the drainage arrangement of plates over a liquid manure or excrement channel 1 in one row one behind the other. The thrust edges 4 of the plates 3 are in FIG. 1 arranged in oblique direction to the longitudinal direction of the liquid manure or excrement channel 1. Thereby the tapered spots at 5 and 6 of the oblique thrust edges 4 are in the cross section formed obliquely or arch-shaped in direction of the lower side of the plates 2 so that the dung removal tools which are moved over them cannot be obstructed or damaged. At the embodiment of plate arrangement according to FIG. 2 the thrust edges 7, 8 of the cover plates 3 arranged in one row one behind the other are formed in a tapered and interengaging manner, towards the center line of the plates 3. The three spots 9, 10, 11 formed thereby are in the cross section formed obliquely or arch-shaped towards the under side of the plates 3 like the tapered spots at 5 and 6 in FIG. 1. At the embodiment of the plate arrangement in FIG. 3 the thrust edges 12 of the plates 3 are bow-shaped and interengaging each other between adjacent plates 3. The two spots 13 and 14 formed thereby are obliquely or arch-shaped again towards the underside of the plates 3.

The longitudinal slots 2 for the manure to pass through in the cover plates 3 can be formed in a conical extending manner towards the underside of the cover plate 3 and the cover plate 3 itself can be furnished at its underside near its longitudinal edges and between the longitudinal slots 2 in parallel line to the thrust edges 4 respectively 7, 8 or 13, 14 with reinforcing ribs 15 which project to the underside.

What I claim is:

1. Cover plates for excrement channels adapted to be set at least in one row one after another having thrust edges between successive adjacent cover plates, said thrust edges between adjacent cover plates being oblique to the lateral edges of the cover plates in such a manner that mechanical excrement removal tools occasionally moved horizontally over said row of cover plates are not obstructed or damaged.

2. Cover plates as per claim 1, in which said thrust edges of adjacent cover plates are formed in tapered and interengaging manner towards the center line of the cover plates.

3. Cover plates as per claim 1, in which said thrust edges of adjacent cover plates are formed in an arch-shaped and interengaging manner between the lateral edges of the cover plate.

4. Cover plates as per claim 1, in which said oblique thrust edges together with said lateral edges of the cover plate form tapering portions having a surface in vertical cross section oblique to the underside of the cover plate.

5. Cover plates as per claim 1, in which said oblique thrust edges together with said lateral edges of the cover plate form tapering portions having surfaces which are arcuate in vertical cross section to the underside of the cover plate.

6. Cover plates as per claim 1, in which said oblique thrust edges are oblique in vertical cross section to the underside of the cover plate all over their length.

7. Cover plates as per claim 1 in which said oblique thrust edges are arcuate in vertical cross section all over their length.

8. Cover plates as per claim 2, in which said thrust edges of tapered interengaging shape form tapering portions having surfaces which are in vertical cross section oblique to the underside of the cover plate.

References Cited by the Examiner
UNITED STATES PATENTS

| 492,777 | 3/1893 | Buchanan | 119—28 |
| 2,516,961 | 8/1950 | Dailey | 119—15 |
| 2,733,684 | 2/1956 | Trenchard | 119—28 |

FOREIGN PATENTS 43,279  12/1908  Switzerland.

SAMUEL KOREN, Primary Examiner.
ALDRICH F. MEDBERY, Examiner.